United States Patent [19]

Bilsing

[11] Patent Number: 4,492,511
[45] Date of Patent: Jan. 8, 1985

[54] CONVEYOR ROBOT

[76] Inventor: Alfred Bilsing, Schwedengraben 12, 5952 Attendorn, Fed. Rep. of Germany

[21] Appl. No.: 278,571

[22] Filed: Jun. 29, 1981

[30] Foreign Application Priority Data

Jun. 28, 1980 [DE] Fed. Rep. of Germany ....... 3024432
Apr. 10, 1981 [DE] Fed. Rep. of Germany ....... 3114476

[51] Int. Cl.³ ........................... B25J 9/00; B30B 15/30
[52] U.S. Cl. ................................... 414/744 A; 901/17; 414/718
[58] Field of Search ................... 414/4, 744 R, 744 A, 414/744 B, 744 C, 225, 718, 728, 751, 659–664, 282, 653; 91/167 R; 901/16, 22, 17, 18

[56] References Cited

U.S. PATENT DOCUMENTS 3,292,804 12/1966 Veneman ............................ 414/659
3,885,678 5/1975 Borg et al. ...................... 414/751 X

FOREIGN PATENT DOCUMENTS 2359763 6/1974 Fed. Rep. of Germany ...... 414/225
2630858 5/1978 Fed. Rep. of Germany .
453292 2/1975 U.S.S.R. ......................... 414/744 A

OTHER PUBLICATIONS

IBM Technical Disclosure Bulletin vol. 15, No. 10, Mar. 1973, Lennemann.

Primary Examiner—Robert J. Spar
Assistant Examiner—Terrance L. Siemens
Attorney, Agent, or Firm—Larson and Taylor

[57] ABSTRACT

A conveyor robot with a double arm with engaging members at both ends which are rotatable about a vertical axis and in a particular case additionally swingable about a horizontal axis. Both engaging members can be simultaneously moved in the longitudinal direction of the arm, in opposite directions. Both engaging members can have a common drive for their movements of rotation and another common drive for their swinging movements.

8 Claims, 10 Drawing Figures

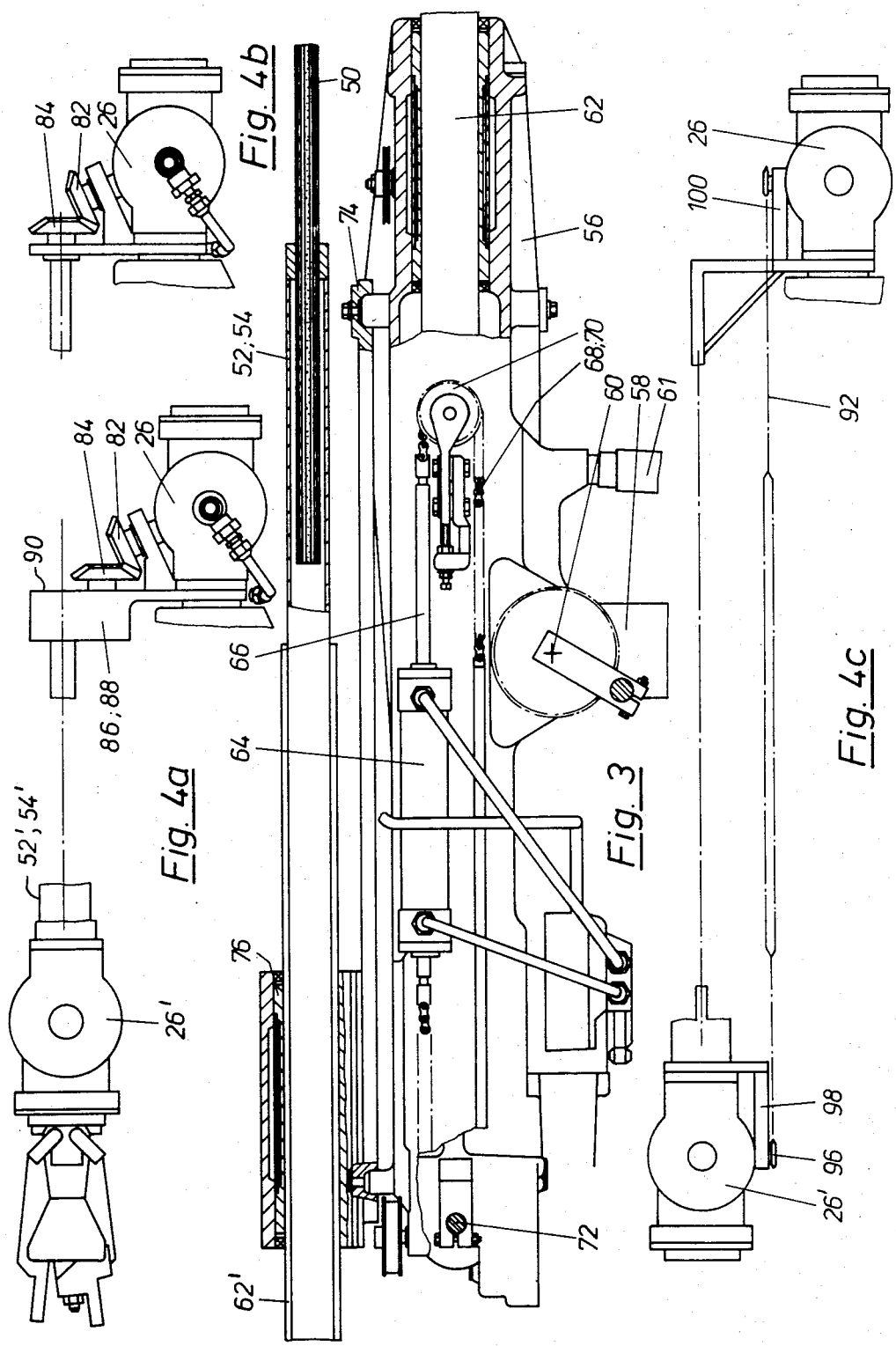

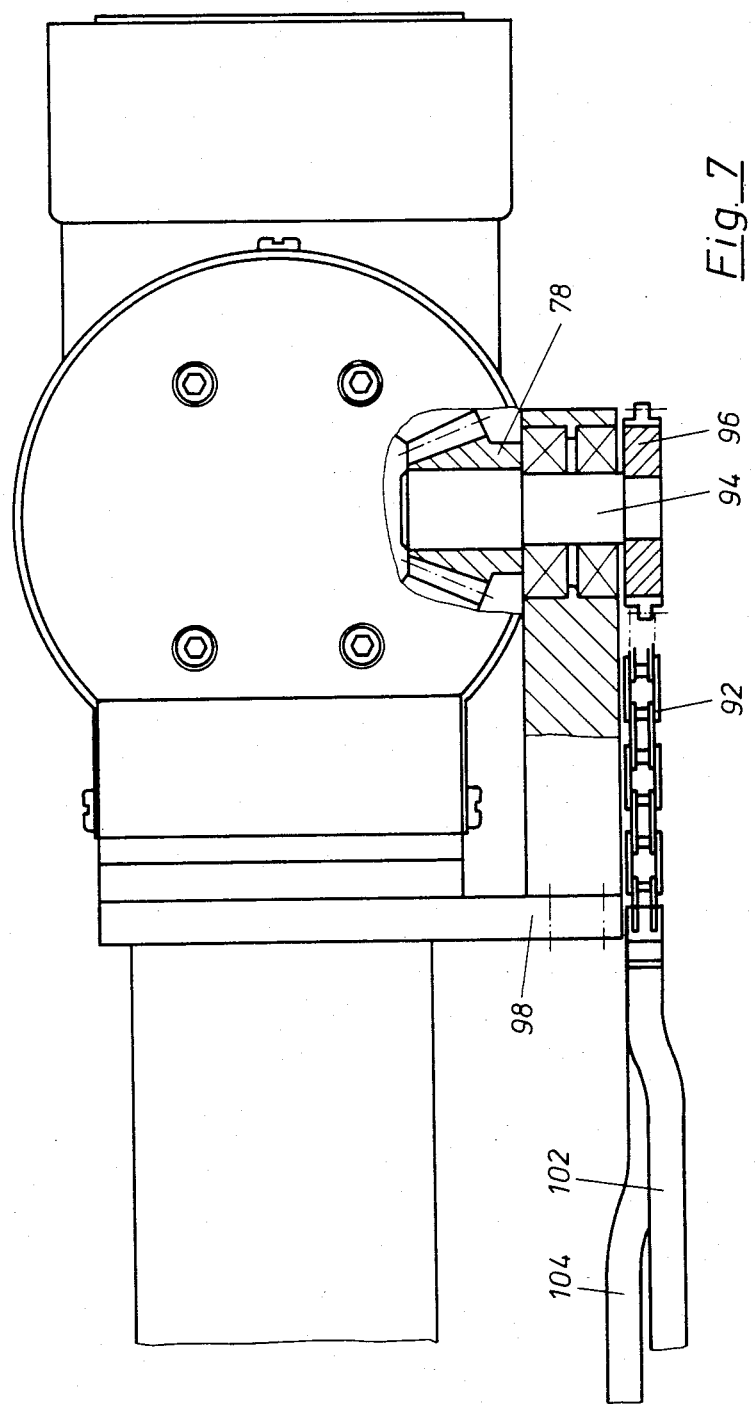

CONVEYOR ROBOT

The invention relates to a double arm conveyor robot, especially for press interlinkage, having an arm rotatable about a vertical axis and possibly also swingable about a horizontal axis, which arm supports engaging members at both ends, wherein the engaging members are movable longitudinally relative to the axis of the arm, i.e. radially relative to the said axis of rotation of the said arm.

Such a "double arm" conveyor robot is described for example in German No. OS 26 30 858. Its two engaging members are borne so as to be longitudinally immovable on a light structural part that serves as an arm. They are simultaneously movable longitudinally only in the sense that the arm as a whole can be moved longitudinally.

As compared to the conventional single-arm conveyor robot having a single engaging member, such a double armed conveyor robot has the advantage that after releasing a workpiece or similar load which was conveyed by one of the engaging members it does not have to swing back empty before it can engage the next workpiece, but rather, the other engaging member already points in the right direction and needs only be moved out to pick up the next workpiece, by swinging or linear movement of the whole arm. Moreover, a double arm conveyor robot with two engaging members disposed at opposite ends of the double arm offers the advantage of a relatively simple inexpensive construction, because even though there are two engaging members, one can still manage with a single turning drive and a single swinging drive for the arm.

The present invention is based on the problem of producing a double arm conveyor robot of the described type, with which still shorter work cycles can be attained.

To solve this problem, it is proposed in accordance with the invention, that the ends of the arm be constituted by two parts that are longitudinally movable relative to the arm on which they are mounted, simultaneously in opposed directions.

By simultaneous longitudinal movement of the two end parts of the double arm which supports the engaging members, before their rotation and/or at the start of the rotation, the inertial mass forces which have to be overcome thereby are minimized. The time saved is particularly significant in those cases where lateral obstructions exist, as for example in the case of the loading of presses whose supporting or guiding columns compel a longitudinally inward motion of the workpiece grasped by the engaging member before rotation of the arm about its vertical axis can begin; and for example, at the end of the conveying process the workpiece, again in the course of rotation, must first be moved longitudinally past an obstacle before the engaging member can move out longitudinally to lay off the workpiece at the designated location. In these situations, using the above described known double arm conveyor robot, after each movement of rotation of the arm the respective empty engaging member must always be drawn in longitudinally by a specific distance while the loaded engaging member has to be moved outward by the same distance to lay off the workpiece and must then negotiate the double distance longitudinally outward before it can engage the next workpiece.

The conveyor robot according to the invention on the contrary uses the time required for the laying off for longitudinal outward movement of the loaded engaging member to also move out the empty engaging member longitudinally into the immediate vicinity of the workpiece to be engaged, so that after laying off of the previously conveyed workpiece only short rapidly executed arm and engaging member movements are necessary to engage the next workpiece.

In the new conveyor robot the advantage is of course ensured, that in spite of the fact that there are a plurality of engaging members, it requires only a single linkage for rotational movement and possibly a single linkage for horizontal swinging movement. Moreover, in a preferred embodiment of the invention there is also the possibility of providing a common drive for turning and/or a common drive for tilting the two engaging members relative to the arm. Hence, not only are there common drives for rotation and swinging the two ends of the arm which support the engaging members, but also there are common drives for turning and tilting the engaging members relative to the arm. As a result, there is also a significant simplification of the control of the movements of the two engaging members.

In a preferred practical embodiment of the invention, the arm consists of a middle part and two longitudinally extendible extension parts guided thereon which can be extended longitudinally on opposite sides. Thereby, the guides and the extension parts, with the engaging members, can be made symmetrical with reference to a transverse plane which intersects the axis of rotation of the arm. There is also the possibility however of disposing the guides of the extension parts in mutually staggered arrangement because even if thereby the engaging members are also somewhat staggered with respect to one another, this is hardly noticeable momentarily during the conveying procedure, while on the other hand there can be considerable structural advantages. This is true especially when in production of the conveyor robot according to the invention one can make use of a single arm conveyor robot already available, the arm of which consists of a middle part and a unilaterally extensible part can be supplemented by another extensible part that extends to the opposite side.

There is also the possibility of making a conveyor robot according to the invention in such a way that one longitudinally movable part will be guided by the other longitudinally movable part.

Depending upon the selected construction and use, one would select the most suitable drive for the guiding of the two parts that are longitudinally movable in opposite directions. Hydraulic cylinders have proved advantageous because they are very precisely adjustable as to stroke and speed. Possibly a single adjustable hydraulic cylinder will suffice for the longitudinal moving out or in of the end of the arm which supports the engaging member if positive guidance is ensured between the two longitudinally movable parts so that they will always be moved by the same amount in opposing directions. This can be effected for example by connection of the two longitudinally movable parts with toothed racks which are in engagement with a longitudinally fixed but rotatably borne cogwheel, on diametrically opposed sides.

In a further preferred practical embodiment of the invention, separate adjustable hydraulic cylinders are provided for the longitudinal drive of the two ends of the arm, which are adjusted in a simple embodiment by parallel regulating elements. If it is so desired, the two separate longitudinal drives may however also be adjusted independently of each other, in order to be able to execute simultaneous movements with different speeds.

A still more extensive acceleration of the conveyor can be obtained with the conveyor robot according to the invention in that the hydraulic cylinder/cylinders for the longitudinal in and out movements of the arm ends are disposed mechanically in series with a pneumatic cylinder. With this proposal it is considered that in many cases it is true that relatively long longitudinal paths must be traversed as rapidly as possible but that only on a short part of the path is it necessary to have precise regulation. The longitudinal distances of specific length that have to be negotiated are then effected with the assistance of the pneumatic cylinder while the adjustable hydraulic cylinders undertake the fine control of the movements in the end zones. Finally the operation speed of the conveyor robot according to the invention can be still further increased if at least a part of the movements of the engaging members relative to the arm effected by the common drive means run counter to each other so that for example one of the engaging members executes an upward tilting motion while at the same time the other engaging member tilts downward. As a result, there is a certain balancing of weight in the drive line of the two engaging members so that the drive force can be less or the acceleration can be greater.

The invention will be described in detail below with reference to the preferred embodiments shown in the drawings, wherein:

FIG. 3 is a partial side view, partly in section, of another embodiment of the conveyor robot according to the invention.

FIGS. 4a, 4b, and 4c show different variants of the drive couplings between the two engaging members of the conveyor robot of FIG. 3.

Figure 5:
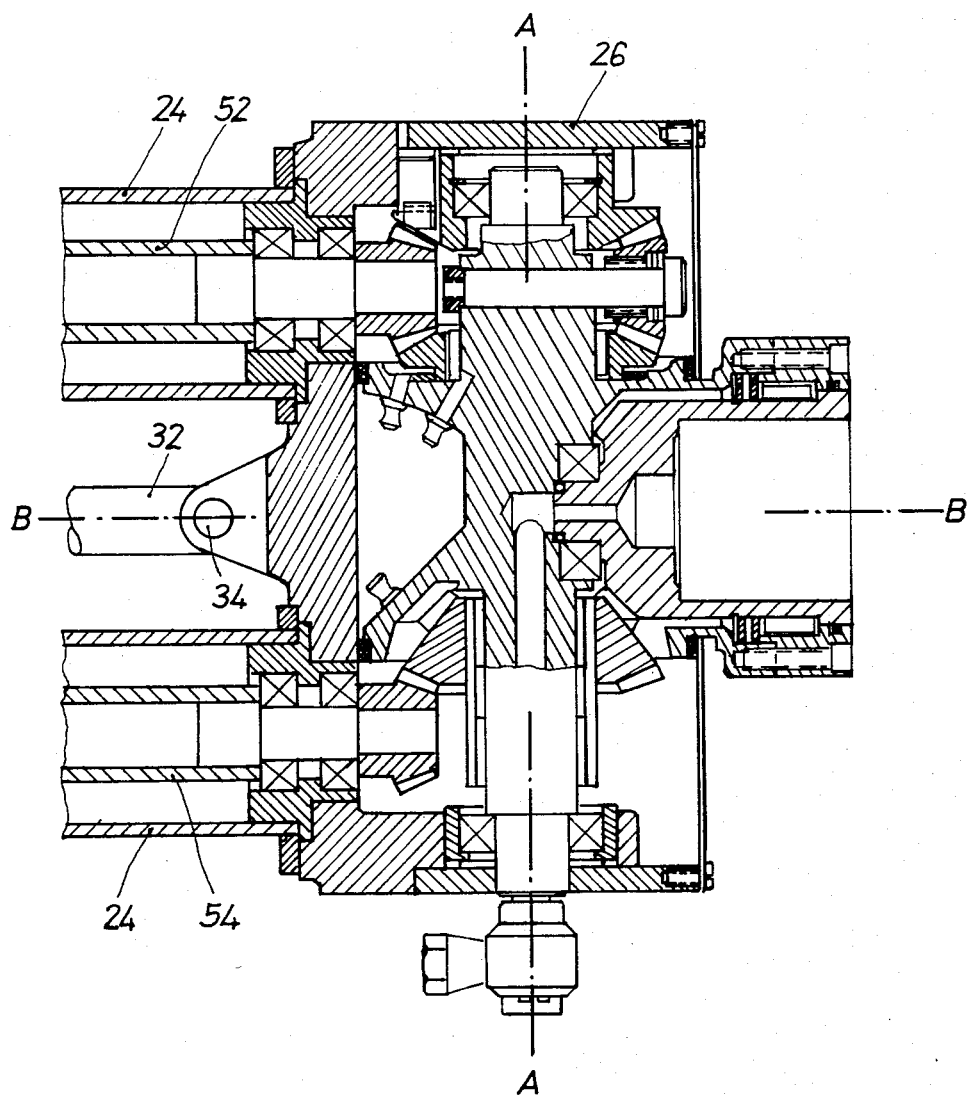

FIG. 5 is a cross-sectional view through a drive unit of an engaging member of the conveyor robot according to FIG. 3.

Figure 6:
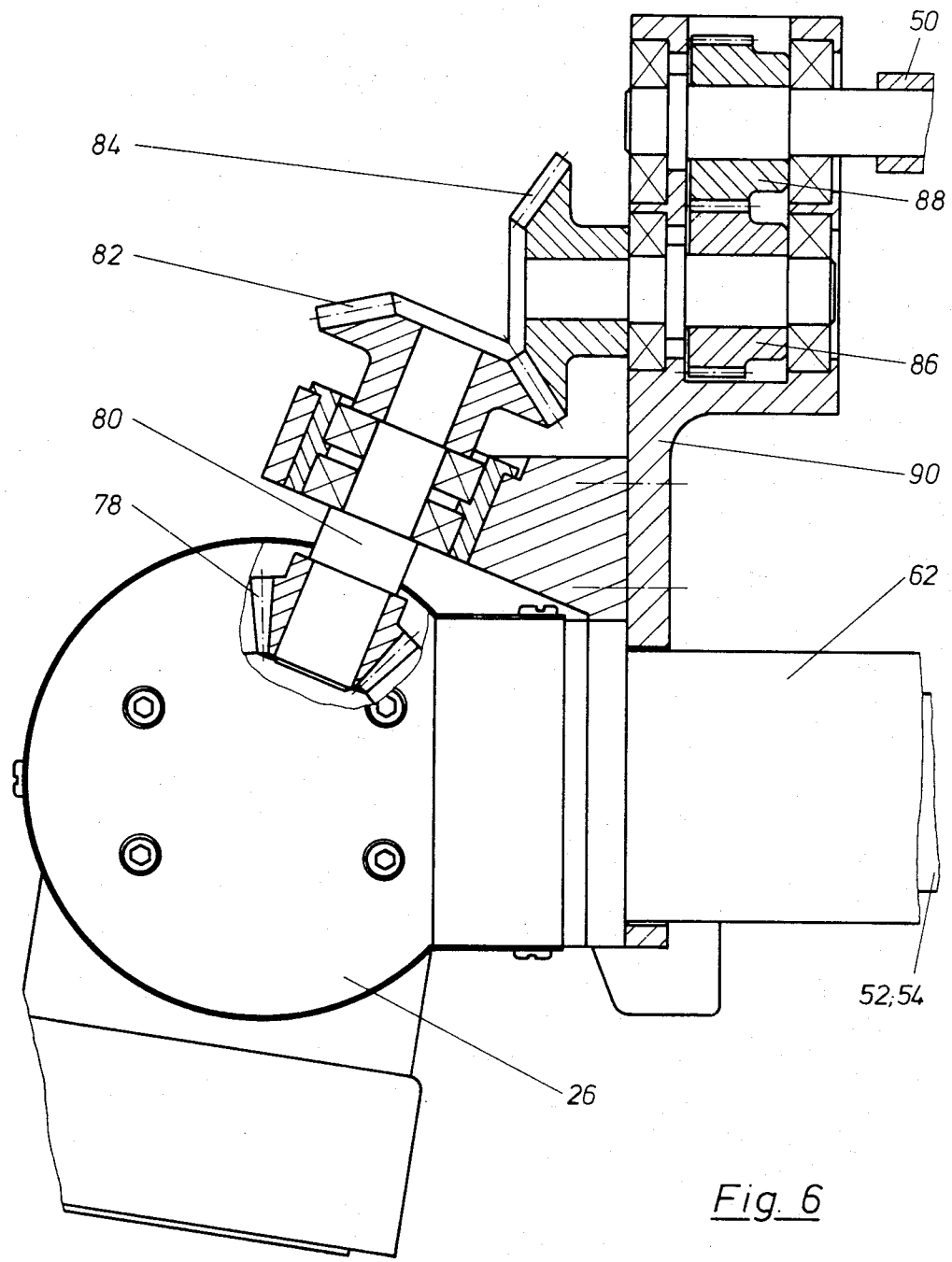

FIG. 6 is an enlarged lateral view, partly in section, of the drive according to FIG. 4a.

FIG. 7 is a detail top view of draw rods clamped in the chain drive of the drive according to FIG. 4c.

Figure 1:
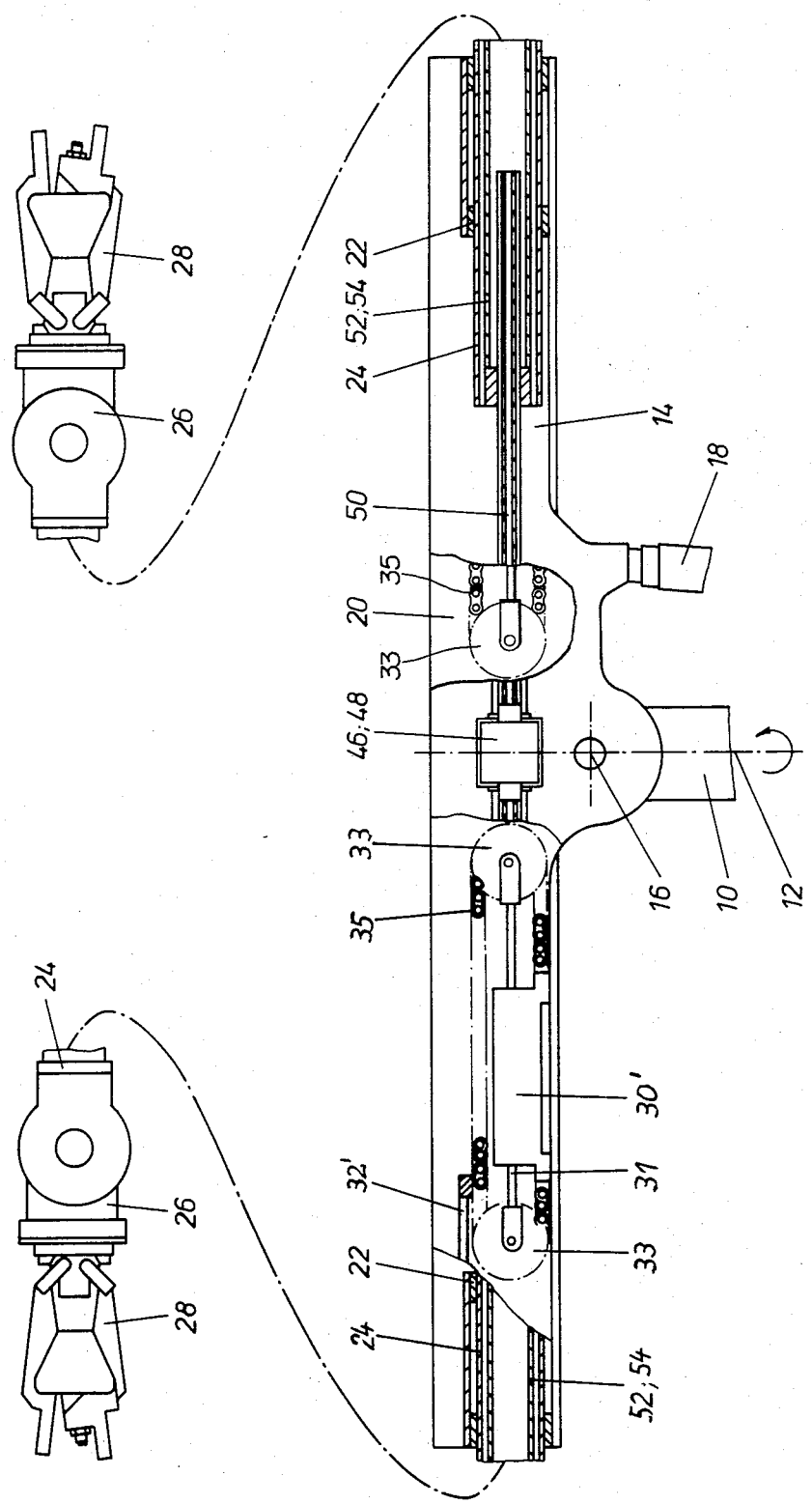
FIG. 1 is a simplified side view, partly in section, of a double arm conveyor robot according to the invention, with portions separated for purposes of clarity.

The conveyor robot shown generally in FIG. 1 has a supporting stand 10 which is rotatable about a vertical axis 12. On stand 10 an arm 14 is borne so as to be swingable about a horizontal axis 16. While the preferably adjustable hydraulic gear provided for rotating the stand 10 about vertical axis 12 is not shown in the drawing, the hydraulic drive which is also adjustable for swinging of arm 14 about the horizontal axis 16 is indicated in the form of a power cylinder 18.

Arm 14 is made as a double arm. It consists of a middle part 20 which receives guides 22 for supporting tubes 24 which can be moved out longitudinally on opposite sides, i.e. radially with respect to axis 12. The tubes 24 form extension parts of arm 14. At their free ends they respectively support a drive unit 26 for the engaging members, whereby, in a manner known per se, a flanged engaging element 28 can be turned about a longitudinal axis which extends along the arm 14, and tilted about a transverse axis. In the present example the respective pairs of supporting tubes 24 disposed next to each other are operatively connected to a drive member 26 for that engaging member (see FIG. 5).

Figure 2:
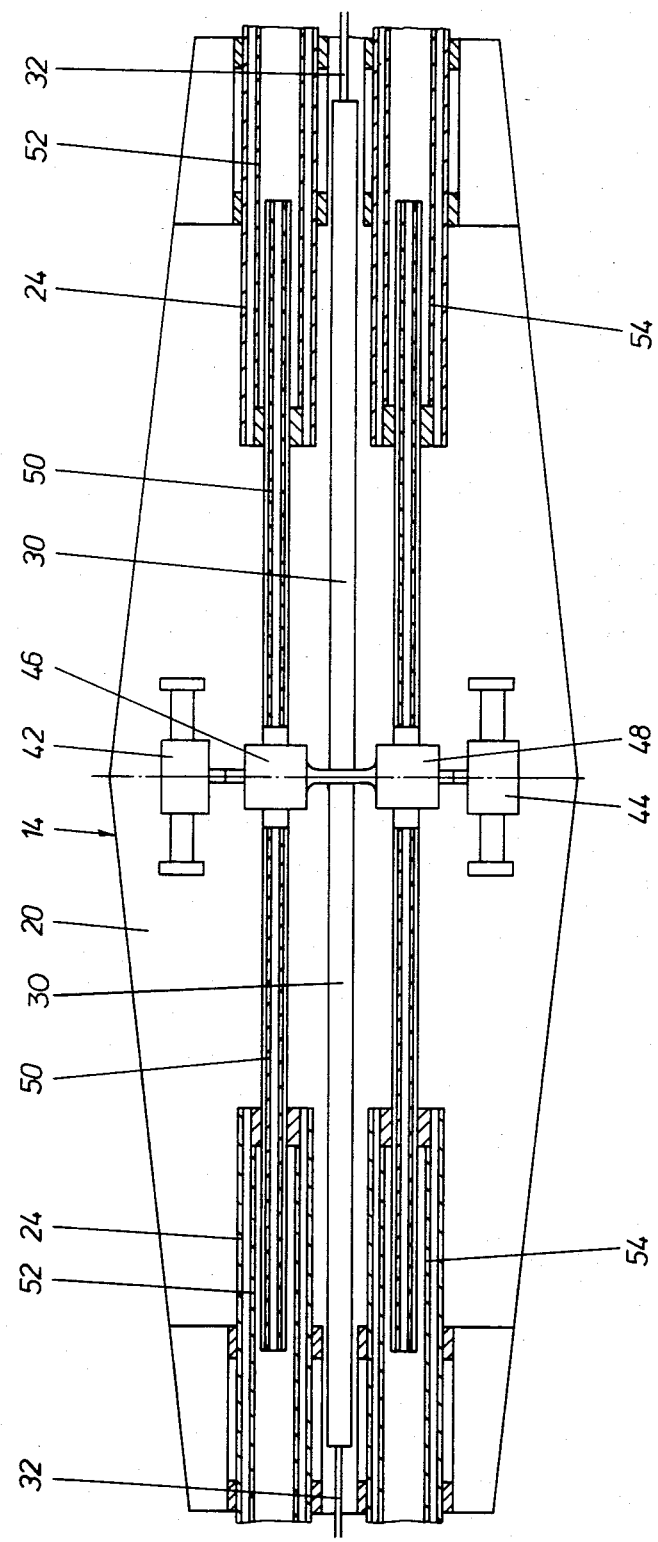
FIG. 2 is a top plan view, partly in section, of the conveyor robot of FIG. 1, but showing a different embodiment of the drive.
Figure 2A:
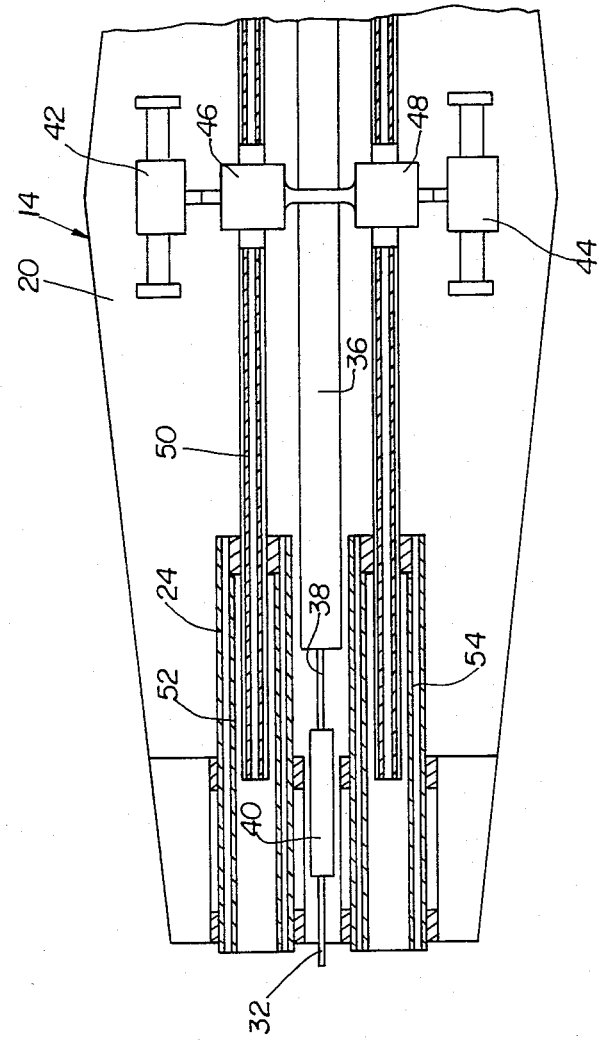
FIG. 2a is a partial top plan view, partly in section, of the conveyor robot of FIG. 1, showing still another embodiment of the drive.

The drive for longitudinal outward and inward movement of the supporting tubes 24 is shown in three different forms of embodiments, one in FIG. 2, one in FIG. 2a and one in FIG. 1. In FIG. 2, an adjustable double acting hydraulic cylinder 30 is shown schematically, which cylinder housing is fixed onto the middle part 20 of the supporting arm. Its piston rod, which is indicated by numeral 32, is fixed at its free ends, as shown in FIG. 5, by means of an articulated pin 34 onto a bearing eye of the housing of the drive unit 26 for that engaging member. In the embodiment shown in FIG. 2a the longitudinal drive means for supporting tube 24 comprises a pneumatic cylinder 36 fixed to the middle part 20 of arm 14. Its piston rod 38 is connected with the housing of an adjustable hydraulic cylinder 40, piston rod 32a of which, again, as shown in FIG. 5, is connected to the housing of the drive unit 26 for that engaging member.

In the embodiment of the drive shown in full on the left side of FIG. 1, and partically on the right side of FIG. 1, a double acting hydraulic power cylinder 30' with its housing is fixed to middle part 20. It has a piston rod 31 which extends out of the housing on both sides, on the ends of which rod sprockets 33 are rotatably borne, over which sprockets a chain 35 is guided. The lower length of the chain is fixed to the cylinder housing while a rod 32' is connected to one of the chain members of the upper chain length, which similarly to piston rod 32 is articulated at its end to the housing of the drive unit for that engaging member.

FIG. 2 shows also the drive for the turning and tilting movements of the engaging member relative to arm 14. The turning drive as well as the tilting drive consist respectively of a regulated hydraulic turning cylinder 42 or 44. These commercially available drive assemblies comprise hydraulic cylinders, the linear piston movement of which is converted by racks and gears into the rotational movement of a drive shaft. The drive shafts of hydraulic turning cylinders 42 and 44 are connected so as to be fixed in rotation with the input shaft of tapered gear drives 46 or 48, respectively. These gears are, like cylinders 42, 44, borne on the middle part 20 of arm 14 and have two opposed outputs at a right angle to the input shaft, said outputs being fixed in rotation with spline shafts 50. The latter engage hollow drive shafts 52, 54 so as to be fixed in rotation therewith but slidably longitudinally therein, and these drive shafts 52, 54 are rotatable with 50, but slidable therealong but axially fixed in supporting tubes 24. The hollow shafts driven by cylinder 42, 44 via tapered gear 46, 48 respectively, via shafts 50 are designated by numerals 52, 54. Each hollow shaft 52 or 54 has a cross section profile at least at its inner end that is adapted to the cross section of spline shaft 50.

The engaging member drive unit 26 shown in FIG. 5 is used in conveyor robots manufactured by the Unimation Co. Inc. of Danbury, Conn. and thus is known per se and will not be discussed in detail. As shown in FIG. 5, a turning motion of hollow shaft 52 causes a tilting motion of the engaging member connected with drive 26 about a tilting axis A that is transverse to the hollow shafts 52, 54, while the turning of hollow drive shaft 54 causes the engaging member to turn about an axis B which is parallel to the axes of shafts 52, 54.

FIGS. 3, 4a, 4b, 4c, 6 and 7 show how a conveyor robot according to the invention can be developed from an existing single arm model. The start is made here from a device of the said Unimation Co. Inc. This device has an arm 56 borne on a stand 58 and rotatable about a vertical axis (not illustrated) and swingable about a horizontal axis 60. An adjustable hydraulic cylinder 61 serves as a drive for swinging movement about the axis 60.

Two supporting tubes 62 are borne with lateral spacing in arm 56, and are guided so as to be axially slidable. There is an adjustable hydraulic cylinder corresponding to the hydraulic cylinder 30 of FIG. 2 for the linear drive for the longitudinal movement of supporting tube 62 (not illustrated). As in FIG. 5, its piston rod is fixed to the housing of a drive unit 26 for that engaging member, said drive being fixedly connected to supporting tubes 62 which issue toward the right from arm 56 (FIG. 3).

Hollow drive shafts 52, 54 extend through tubes 62 as shown in FIG. 5. One of these drive shafts serves, corresponding to the embodiment according to FIGS. 1 and 2, for turning, and the other for tilting engaging member 28. The drive of both shafts 52, 54 is effected in the embodiment according to FIG. 3, however, by a power cylinder 64 whose piston is connected to piston rod 66 connected to chain 68. This chain runs to the right (FIG. 3) over a tensioning wheel 70 and to the left via a sprocket (not shown) borne on a shaft 72 which acts via a mitre gear (not illustrated) on a spline shaft which corresponds to spline shaft 50 of FIGS. 1 and 2. Said shaft in turn engages so as to be fixed in rotation but axially slidable on a fitting spline inner profile of hollow shaft 52 or 54, which is rotatably borne in supporting tube 62.

As described thus far, the conveyor robot of FIG. 3 is known. What is new is the disposition of an additional drive 26' for the engaging member, on the left side of arm 56, with reference to FIG. 3 (see also FIGS. 4a and 4c) A bearing plate 74 is bolted on top of arm 56 to provide a bearing for this additional drive 26' for a second engaging member 28. Said bearing plate 74 has two bearings 76 next to each other for additional supporting tubes 62'. These latter elements correspond to the above mentioned supporting tubes 62 and are fixed in the same way as they are connected with drive 26, or drive 26'. In addition, according to FIGS. 4a, 4b drive shafts 52', 54' can extend through tubes 62', corresponding to the mentioned drive shafts 52, 54.

Moreover, on bearing plate 74 there is fixed a regulated hydraulic cylinder (not shown) corresponding to hydraulic cylinder 30 of FIG. 2, the piston rod of which, corresponding to piston rod 32, is fixed on the housing of drive unit 26' of the engaging member.

In a preferred embodiment of the invention there is a drive connection between the two drives 26 and 26'. Obviously this can be made in various ways, so that the embodiments illustrated in FIG. 1 to 3 are to be regarded only as an example, along with which there could be other arrangements.

According to FIG. 4a and FIG. 6 the turning and tilting motions of drive 26 are effected via two supplementary tapered gears 78 which are in engagement with corresponding tapered gears of the drive unit for the engaging member from which they are taken off and led out via intermediate shafts 80 upward from drive unit 26. Via a pair of gears 82, 84 which constitute a mitre gear and a pair of spur gears 86, 88 which constitute a reversing gear, the drive torque is transmitted respectively to one of two parallel spline shafts 50' which according to FIG. 3 are not rotatable but are in axially slidable engagement with the hollow drive shafts 52', 54'.

If reversal of the direction of rotation is not necessary, the reversing drive 86, 88 can be omitted as shown in FIG. 4b.

A suitable holding device 90 can be fixed to the ends of supporting tubes 62 to provide a bearing for intermediate shaft 80, mitre gear 82, 84 and possibly the reversing drive 86, 88.

For transmission of torque from drive 26 to drive 26', according to FIG. 4c and FIG. 7, as an alternative to the arrangements according to FIG. 4a, b, chain drive 92 can be provided. In this case advantageously a gear 78 engages both drive units 26 and 26', said gear 78 being fixed in rotation via an intermediate shaft 94 with a gear 96. The arrangement of drive units 26 and 26', according to FIG. 4c are so selected that the intermediate shaft 94 connected at the top in one drive unit and at the bottom in the other. For the bearing of intermediate shaft 94 there are again suitable holding devices 98 and 100 respectively, disposed at the ends of supporting tubes 62 and 62'.

In the chain drive 92 there are advantageously clamped tensioning rods 102, 104. By angle bending of these rods it is possible to cross them to attain a reversal of the direction of rotation. The tensioning rods can be guided in gearings.

One or more chain tensioning wheels (not illustrated) effect a uniform chain tensioning in spite of the different distances between drives 26 and 26'.

The examples of embodiments according to FIGS. 3 to 7 show constructions in which the longitudinal axis of the supplementary drive unit 26' for the engaging member is staggered with reference to that of drive unit 26 for the other engaging member. The shifted height of the longitudinal axes of the engaging members can be balanced out simply by the control, and offers the advantage of simpler mechanical connection between the two drives. Obviously there is also the possibility of disposing the two drives coaxially, whereby either the drive connection between them must be bent down twice, or extend through arm 56.

The above described embodiments concern conveyor robots whose arm consists of a middle part which can be turned and swung, and elongation parts borne and guided thereon, which can be extended to opposite sides. Both for the longitudinal movements of the extension parts as well as for the movements of the engaging member relative to the arm, drive units are provided for the sake of simplicity which act on both engaging members, in all the examples of embodiment. It is understood that the arm can consist also on only two parts that are longitudinally slidable with reference to each other, whereby one of the parts is borne on the stand not only so as to be rotatable and swingable but also so as to be slidably guided longitudinally, while the other part is guided slidably in the longitudinal direction on the first-named part. Just as in the embodiments that have been described in detail, in the last mentioned construction also there can be provision selectively on common or individual drives for the longitudinal and/or turning and/or tilting movements of the two engaging members.

In a further supplement to the embodiments according to FIGS. 3, 4, 6 and 7 there is the possibility of connecting the housings of drive units 26 and 26' with each other by a rod, moving the drive unit 26 in the above described way by a regulatable hydraulic cylinder, yet not fixing the working cylinder necessary for simultaneous longitudinal movement of the opposite drive unit 26' for the engaging member to bearing plate 74 but integrating it in the connecting rod between the two drive housings.

If the movement speed of this latter power cylinder is greater than the speed of the drive acting on drive unit 26 of the engaging member, both engaging members can be extended or retracted longitudinally at the same time. There is also the possibility, by actuation of only the normal longitudinal drive for the engaging member connected with drive 26 to carry along the opposite engaging member via the mentioned connecting rod.

In the embodiment according to FIGS. 1 and 2, instead of the reversing drive 86, 88 there could be taper gear drive 46 and/or 48 whose drive output shafts run in opposed directions of rotation.

I claim:

1. A conveyor robot comprising:
an elongated arm rotatable about a vertical axis, a pair of extensions, one for supporting an engaging member at each end of the arm, such that each engaging member is movable longitudinally of the arm to extend out from and retract towards said vertical axis, each extension having a center line about which the extension is symmetrical, said extensions being mounted with their said center lines in a common vertical plane with the said vertical axis, said extensions, with their respective engaging members being movable simultaneously in opposite directions, means for swinging said arm, and hence also said extensions and said engaging members about a common central horizontal axis, and including a separate drive means for driving each of the extensions in said longitudinal movement, each drive means comprising a double acting hydraulic cylinder mounted on the arm and including a piston rod extending out in two opposite directions, a pair of sprocket wheels mounted on the arm, having their axes perpendicular to the rod and connected to the opposed ends of the rod, and including an elongated element encircling both of said sprocket wheels and fixed at one point to the arm, and including a means connecting the elongated element and the respective extensions.

2. A conveyor robot adapted especially for the interlinking of presses, comprising:
an elongated arm mounted for rotation about a central vertical axis, means for supporting an engaging member at each end of the arm, each of said engaging members being operable independently of the other for gripping an object, said elongated arm, said engaging members and said vertical axis arranged in a common vertical plane,
means for swinging the arm, and hence also said engaging members, about a common central horizontal axis,
and including arm extensions at each end of the arm, each extension having a center line about which the extension is symmetrical, said extension center lines also located in the said plane containing the vertical axis, each extension mounting the engaging member located at its end and being movable longitudinally of the arm to extend its respective engaging member longitudinally,
and extension drive means for operating each of the extensions for moving the engaging members in opposite directions.

3. A conveyor robot according to claim 2, wherein one of said arm extensions is supported by and guided by the other arm extension.

4. A conveyor robot according to any one of claims 2 or 3, comprising a separate drive for effecting longitudinal movement of each of the longitudinally movable engaging members in opposite directions.

5. A conveyor robot according to any one of claims 2 or 3, including drive means for driving the engaging members in said longitudinal movement, said drive means comprising an hydraulic cylinder connected to the arm.

6. A conveyor robot according to claim 5, said drive means including a pneumatic cylinder in series with the hydraulic cylinder.

7. A conveyor robot according to claim 2, said extension drive means comprising a double acting fluid cylinder having a piston rod extending in both directions, a chain sprocket mounted at each end of the piston rod, a chain guided over the sprockets, the chain being fixed at one point to the arm and at another point to at least one of said extensions.

8. A conveyor robot according to any one of claims 2 or 3, including a common drive means for turning each engaging member about a longitudinal axis through its respective arm and for tilting each of the engaging members about an axis transverse to its respective longitudinal axis.

* * * * *